(12) United States Patent
Drewery et al.

(10) Patent No.: US 7,391,086 B1
(45) Date of Patent: Jun. 24, 2008

(54) CONDUCTIVE CONTACTS AND METHODS FOR FABRICATING CONDUCTIVE CONTACTS FOR ELCTROCHEMICAL PLANARIZATION OF A WORK PIECE

(75) Inventors: John Drewery, Santa Clara, CA (US); Francisco Juarez, Fremont, CA (US); Henner Meinhold, Fremont, CA (US)

(73) Assignee: Novellus Systems, Inc., San Jose, CA (US)

( * ) Notice: Subject to any disclaimer, the term of this patent is extended or adjusted under 35 U.S.C. 154(b) by 111 days.

(21) Appl. No.: 11/478,150

(22) Filed: Jun. 28, 2006

(51) Int. Cl.
H01L 29/76 (2006.01)
H01L 29/94 (2006.01)
H01L 31/062 (2006.01)
H01L 31/113 (2006.01)
H01L 31/119 (2006.01)

(52) U.S. Cl. .................. 257/388; 257/383; 257/762; 257/E21.006; 257/E21.593

(58) Field of Classification Search ................. 257/388, 257/383, 396, 643, 762, 774, 792
See application file for complete search history.

(56) References Cited

U.S. PATENT DOCUMENTS

| 5,605,488 | A | * | 2/1997 | Ohashi et al. | 451/7 |
| 5,853,317 | A | * | 12/1998 | Yamamoto | 451/288 |
| 6,368,190 | B1 | * | 4/2002 | Easter et al. | 451/41 |
| 6,482,307 | B2 | | 11/2002 | Ashjaee et al. | |
| 6,736,952 | B2 | * | 5/2004 | Emesh et al. | 205/81 |
| 2005/0016861 | A1 | * | 1/2005 | Laursen et al. | 205/222 |

* cited by examiner

*Primary Examiner*—David Nhu
(74) *Attorney, Agent, or Firm*—Ingrassia Fisher & Lorenz, P.C.

(57) ABSTRACT

Conductive contacts and methods for fabricating conductive contacts for electrochemical mechanical planarization are provided. A conductive contact in accordance with an exemplary embodiment of the invention includes, but is not limited to, a first conductive surface formed of a flexible material, a conductive element that is disposed remote from the first conductive surface and that is configured for electrical coupling to an external circuit, and an intermediate portion that electrically couples the first conductive surface and the conductive element.

21 Claims, 6 Drawing Sheets

CONDUCTIVE CONTACTS AND METHODS FOR FABRICATING CONDUCTIVE CONTACTS FOR ELCTROCHEMICAL PLANARIZATION OF A WORK PIECE

FIELD OF THE INVENTION

The present invention generally relates to systems for polishing or planarizing work pieces, such as semiconductor wafers, and more particularly relates to an apparatus and method for electrochemical planarization of a wafer.

BACKGROUND OF THE INVENTION

Chemical mechanical polishing (CMP) is a technique that has been conventionally used for planarization of metal layers of semiconductor wafers, such as during damascene processing. It is often used in the formation of microelectronic devices to provide a substantially smooth, planar surface suitable for subsequent fabrication processes such as photoresist coating and pattern definition. A typical CMP apparatus 10 suitable for planarizing a semiconductor surface is illustrated in FIG. 1 and includes a wafer carrier 12 configured to support, guide, and apply pressure to a wafer 14 during the polishing process. The carrier 12 may be raised and lowered to load a wafer, and may be rotated about a first axis 16. The carrier may comprise a pressure control system 24 that applies a substantially constant pressure distributed across the back of the wafer 14. The pressure control system may take any suitable form, such as, for example, that of an inflated bladder formed from an elastomeric material. A retaining ring 18 may be provided to prevent the wafer 14 from being dragged out from between the carrier 12 and a polishing pad 20 by polishing forces. The polishing pad 20 is supported by a rigid platen 22 that may rotate about a second axis 26 or, alternatively, may move in an orbital, linear or other motion. The polishing pad typically comprises a polymeric material with a predetermined elastic modulus and surface structure that simultaneously provide effective polishing of the wafer and compliance with the wafer over lateral features that may differ in height on the order of several centimeters. Motion is imparted to the wafer carrier 12 and to the polishing pad 20 so that the wafer is rubbed against the pad. A liquid slurry 28 may be injected onto the pad via a nozzle 30 or may be distributed to the polishing pad surface through the polishing pad to chemically weaken the molecular bonds at the wafer surface so that the mechanical action of the polishing pad and slurry can remove the undesired material from the wafer surface.

However, the CMP process tends to leave stresses in the worked wafer leading to subsequent cracking and shorting between metal layers of the wafer. Furthermore, the CMP process may result in sheering or crushing of fragile dielectric layers. This process also has a tendency to cause dishing in the center of wide metal features, such as trenches and vias, dielectric erosion between metal features, and dielectric loss. Electrochemical mechanical planarization (ECMP) is an attractive alternative to removal of metal by CMP because it imparts reduced mechanical stresses to the wafer, and consequently is less likely to reduce the integrity of the devices. In addition, because the removal rate of the metal may be completely controlled by a current flowing through the metal, ECMP is less likely to cause dishing, oxide erosion, and oxide loss of the dielectric layer.

In ECMP, metal removal is accomplished by electrolysis rather than by the corrosive action of a slurry. A conventional ECMP system, illustrated in FIG. 2, is similar to a CMP system in that it comprises a wafer carrier 12 that carries a wafer 14 and comprises a polishing pad 20 that is supported by a rigid platen 22. Electric contacts 42 are disposed within the platen 22 and extend through the polishing pad 20 to make contact with the surface of the wafer 14. To complete the ECMP system 40, the wafer is exposed to an electric field in the presence of an electrolyte 48. In this regard, counter electrodes 44 are provided. Varying voltages may be imposed between the wafer and the counter electrodes by a power supply 46. The counter electrodes 44 allow for a degree of "tuning" of the uniformity of removal of the metal by passing varying current through the individual electrodes. The pad typically comprises holes to allow ion transport from the wafer 14 to the counter electrodes 44 or, alternatively, the pad is sufficiently porous that this ion transfer may occur. The electrolyte 48 may be dispensed onto the polishing pad or may be distributed through the polishing pad to the wafer surface.

A primary objective of ECMP technology is to reduce damage to delicate structures on the wafer by reducing the forces that are applied to the wafer. However, electrical contact schemes of the prior art typically negate this objective. Small electrical contacts may exert forces on the wafer that may be much greater than those produced even in high downforce CMP. Such contacts can only be made to the part of the wafer that does not contain delicate devices, that is, practically, to the wafer edge. However, wafer edge contacts create "terminal effects" that limit the amount of metal than can be removed from the wafer. In addition, stiff contacts that are driven on and off the wafer surface during processing may result in wear to the contacts and damage to the wafer. Electric contacts formed of flexible materials with sufficiently low resistivities typically are not sufficiently inert under the anodic condition of the wafer and therefore suffer from corrosion.

Accordingly, it is desirable to provide a flexible, conductive contact for an ECMP system that has low resistivity and is thermodynamically inert under ECMP conditions. In addition, it is desirable to provide an ECMP polishing apparatus that provides controlled planarization of the wafer surface. It also is desirable to provide a method for forming a contact for use in an ECMP system. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 3:
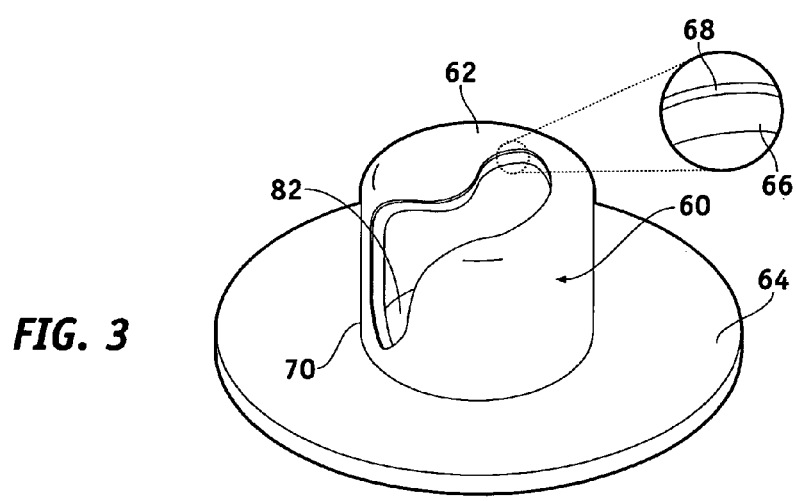
FIG. 3 is a schematic illustration of a conductive contact in accordance with an exemplary embodiment of the invention.

FIG. 3 illustrates a conductive contact 60 for use in an ECMP apparatus in accordance with an exemplary embodiment of the present invention. As described in more detail below, conductive contact 60 is configured to be disposed within holes or openings formed in a polishing pad (not shown) of an ECMP apparatus. Conductive contact 60 comprises a first surface 62 and a second surface 64 that is disposed remote from and substantially parallel to first surface 62. An intermediate portion 70, that is, in this embodiment a side surface 70, electrically couples first surface 62 and second surface 64.

As illustrated in the cutaway diagram of FIG. 3, conductive contact 60 is formed from a flexible material 66. A thin layer 68 of conductive material overlies the first surface 62, second surface 64, and side surface 70 of flexible material 66. Flexible material 66 may be any suitable flexible insulative material, such as a polymer, that is substantially inert to the electrochemical environment of the ECMP process. Examples of materials suitable for flexible material 66 include KAPTON® polyimide film and MYLAR® polyester film, both from DuPont of Circleville, Ohio. Conductive material layer 68 may comprise any suitable conductive material that also is inert to the electrochemical environment of the ECMP process, such as, for example, a noble metal. In a preferred embodiment, conductive material layer 68 comprises gold. Conductive material layer 68 may have any suitable thickness that permits conduction of an electrical current while still maintaining the flexibility of first surface 62. In a preferred embodiment of the invention, the conductive material layer 68 has a thickness of about 10 to about 125 microns. As described in more detail below, the first, second, and side surfaces of conductive contact 60 form an open space 82 that may or may not be filled with a compressible fluid or other material.

Figure 4:
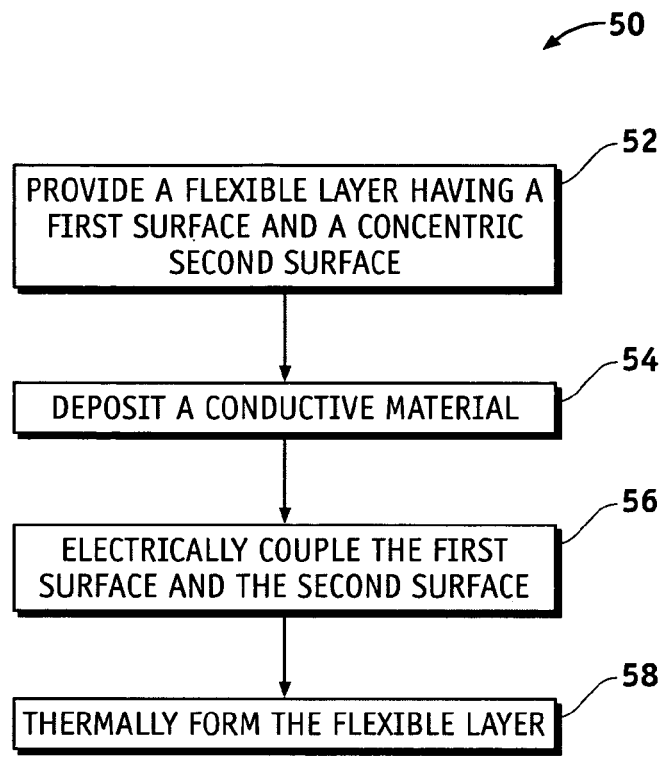
FIG. 4 is a flowchart of a method for fabricating the conductive contact of FIG. 3, in accordance with an exemplary embodiment of the present invention.

A method 50 for forming a conductive contact, such as conductive contact 60 of FIG. 3, is illustrated in FIG. 4. The method includes the step of providing a substantially flat, flexible material layer that has a first surface, a concentric second surface, and intermediate portion interposed between the first surface and second surface (step 52). A conductive material is deposited on the first surface and second surface (step 54). The conductive material layer may be deposited by any conventional technique, such as, for example, sputtering, plasma vapor deposition (PVD), or chemical vapor deposition (CVD), and may be deposited to any suitable thickness that permits conduction of an electrical current while still maintaining the flexibility of the first surface. In a preferred embodiment of the invention, the conductive material layer is deposited to a thickness of about 10 to about 125 microns. The first surface and the second surface are electrically coupled (step 56), as discussed in more detail below, and the flexible layer is subjected to thermal forming, as is well known (step 58). The flexible layer and conductive material layer are thermally formed about a mold that results in the first surface of the conductive contact disposed in a first plane and the concentric second surface disposed in a second plane that is remote from and parallel to the first plane.

In one embodiment of the invention, the first surface and the second surface are electrically coupled by the intermediate portion of the conductive contact. In this regard, a conductive material is deposited onto the intermediate portion such that the conductive material of the first surface and the conductive material of the second surface are electrically coupled via the conductive material of the intermediate portion. The conductive material deposited on the intermediate portion may be the same material as the conductive materials deposited on the first and second surfaces or may be a different material. In a preferred embodiment of the invention, a conductive material is deposited over the first and second surfaces and the intermediate portion in one deposition process.

Figure 5:
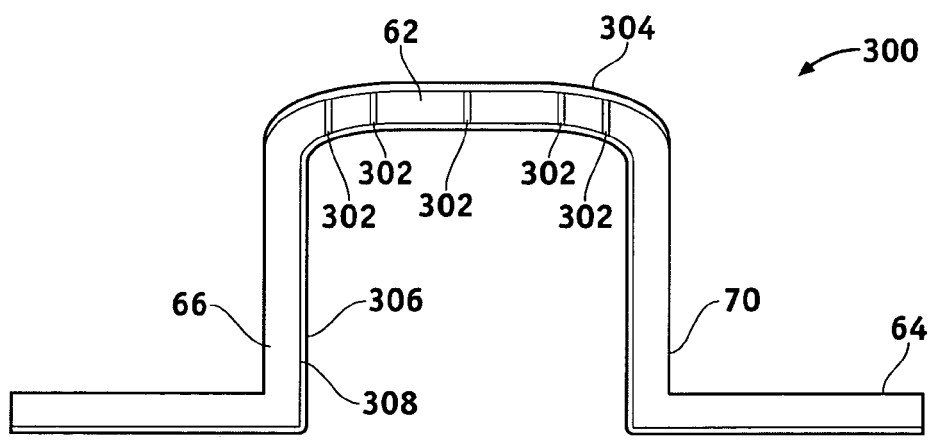
FIG. 5 is a cross-sectional view of a conductive contact in accordance with an exemplary embodiment of the invention.
Figure 6:
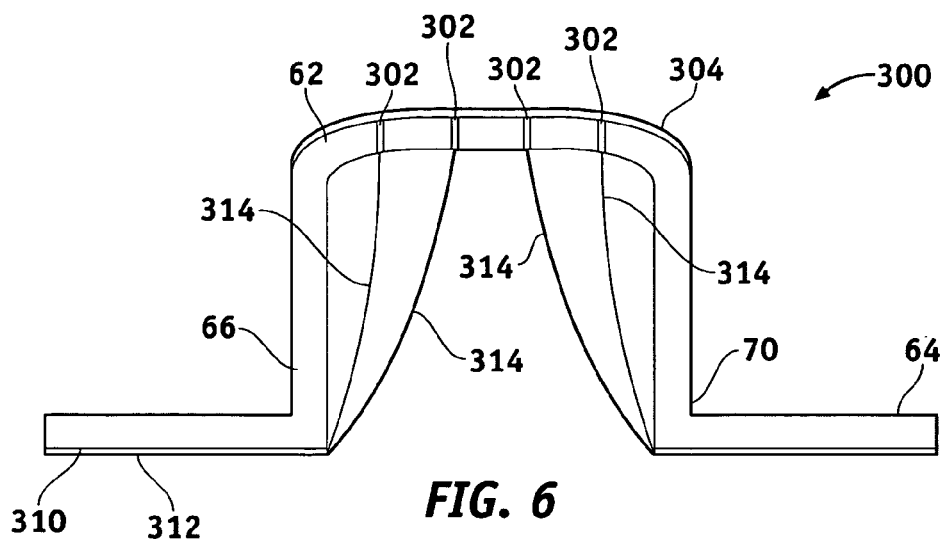
FIG. 6 is a cross-sectional view of a conductive contact in accordance with another exemplary embodiment of the invention.

It will be appreciated that the steps of method 50 are not restricted to the order described above with reference to FIG. 4. For example, referring to FIG. 5, in another embodiment of the invention, a conductive contact 300 may be formed by providing flat, flexible material 66 having a first surface 62, a concentric second surface 64, and a side surface 70 disposed between the first and second surface (step 52). The first surface 62 comprises a plurality of conductive vias 302 that extend through first surface 62. Conductive vias 302 may be formed by any suitable technique known in the printed circuit board industry. A conductive material 304 is deposited on first surface 62 and is electrically coupled to conductive vias 302 (step 54). The flexible material layer 66 is thermally formed about a mold that results in the first surface 62 disposed in a first plane and the concentric second surface 64 disposed in a second plane that is not the first plane and parallel to the first plane (step 58), and the conductive material 304 of first surface 62 is electrically coupled to second surface 64 (step 56). In one embodiment of the invention, the conductive material 304 of first surface 62 is electrically coupled to second surface 64 by depositing a conductive material 306 on an underside surface 308 of flexible material layer 66. In another embodiment of the invention, as illustrated in FIG. 6, a conductive material 312 may be deposited on an underside surface 310 of second surface 64. The conductive material 312 then may be electrically coupled to conductive material 304 by wires 314 that are electrically connected to vias 302.

Figure 7:
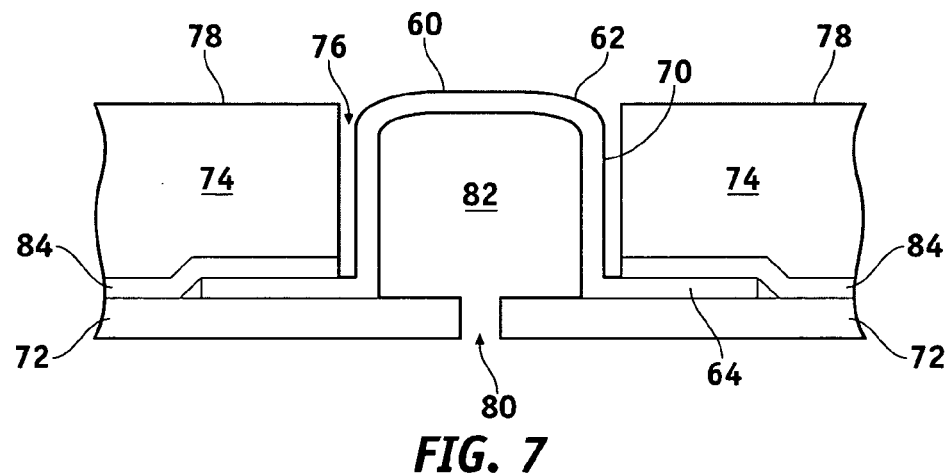
FIG. 7 is a cross-sectional view of a conductive contact in accordance with yet another exemplary embodiment of the invention.

Referring to FIG. 7, the conductive contact of the present invention, such as conductive contact 60, may be disposed on a support member 72. The support member 72 may be the platen of an ECMP system or, in a preferred embodiment, may be an elastomeric backing pad such as a polyurethane pad having a thickness in the range of about 300 to 2000 microns. The conductive contact may be secured to support member 72 using any suitable well-known method such as, for example, solder or an adhesive. A polishing member 74 having a hole 76 is secured to support member 72 in manner that permits conductive contact 60 to extend through hole 76 of polishing member 74. Polishing member 74 may be any conventional polishing pad or other polishing surface known in the art. In a preferred embodiment of the invention, conductive contact 60 may have a width or diameter in the range of about 0.5 to about 5 cm, more preferably about 1 cm. Conductive contact 60 has a height such that, when a wafer is pressed against a polishing surface 78 of polishing member 74 with a predetermined force, first surface 62 of conductive contact 60 is substantially coplanar with surface 78 of polishing member 74. In a preferred embodiment of the invention, the conductive contact 60 has a height in the range of about 300 to 2000 microns. In a more preferred embodiment, the conductive contact has a height of about 750 to 2000 microns. A conductive structure 84 may be used to make an electrical connection between the conductive material layer 68 of conductive contact 60 and an external circuit. In an exemplary embodiment of the present invention, conductive structure 84 may comprise conductive traces formed on a thin flexible insulating material such as KAPTON® polyimide film or MYLAR® polyester film. These traces are configured so as to be electrically coupled to the second surface 64 of contact 60. Conductive structure 84 may be secured to conductive contact 60 by a conductive adhesive, conductive paint, or the like. The conductive traces of conductive structure 84 may then be used to connect contact 60 to an external circuit (not shown). In an exemplary embodiment of the invention, conductive structure 84 and one or more contacts 60 may be contiguous and formed from the same flexible insulating material.

While only one conductive contact 60 is illustrated in FIG. 7, it will be understood that any suitable number of conductive contacts 60 may be disposed on support member 72 within holes 76 in polishing member 74. The number of conductive contacts on support member 72 and the widths or diameters of the conductive contacts may be selected based on the thickness and distribution of metal to be removed from a wafer. In a preferred embodiment of the invention, one (1) to one hundred (100) conductive contacts 60 may be utilized. The conductive contacts may be distributed randomly throughout polishing member 74 or may be arranged so that the conductive contacts remain in continuous contact with the wafer when the wafer is urged against the polishing member 74 during an ECMP process and motion is imparted between the wafer and the polishing member 74. In a preferred embodiment of the invention, polishing member 74 and support member 72 are moved orbitally while the wafer is rotated about its axis to facilitate continuous contact of the conductive contacts with the wafer. The conductive contacts also may be arranged in "zones" so that different electric currents can be applied to the various zones.

In an exemplary embodiment of the present invention, support member 72 may have a port 80 that is in fluid communication with open space 82 of conductive contact 60. In this manner, a fluid, such as a gas or a liquid, may be urged from a manifold apparatus (not shown) of the ECMP apparatus through port 80 and into open space 82 to extend first surface 62 of conductive contact 60 so that it is coplanar with or extends beyond polishing surface 78 of polishing member 74. In one embodiment of the invention, air may be applied through port 80 at a pressure in the range of about 0.1 to about 10 psi. In another embodiment of the invention, an electrolyte solution that is supplied to the surface 78 of polishing member 74 during the ECMP process may be urged through port 80 to extend surface 62 of conductive contact 60. In this regard, if conductive contact 60 bursts or tears, thus exposing the material within open space 82, the chemistry of the ECMP process will not be negatively affected. In another embodiment of the invention, a negative pressure may be applied to open space 82 through port 80 so that surface 62 is urged towards support member 72 and below surface 78 of polishing member 74. In this manner, surface 78 of polishing member 74 may be conditioned without wear or damage to the conductive material 68 of first surface 62.

Figure 8:
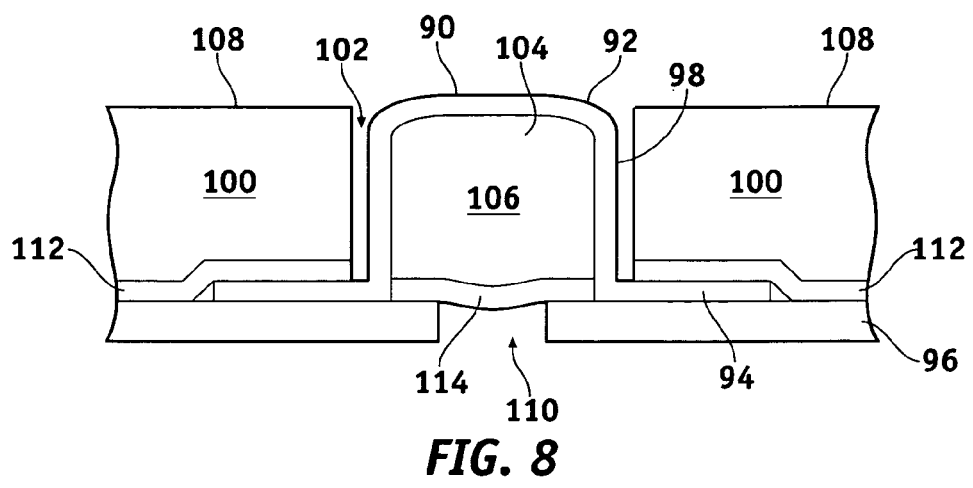
FIG. 8 is a cross-sectional view of a conductive contact in accordance with a further exemplary embodiment of the invention.

Referring to FIG. 8, in accordance with another exemplary embodiment of the present invention, a conductive contact 90 is illustrated. Conductive contact 90 may be fixedly attached to a support member 96 and is disposed within a hole 102 of a polishing member 100. Conductive contact 90 is similar to conductive contact 60 of FIG. 3 to the extent that it is formed from a flexible insulative material, such as the flexible insulative material 66, upon which is disposed a conductive material layer, such as conductive material layer 68. Conductive contact 90 comprises a first surface 92, a second surface 94 disposed remote from and substantially parallel to first surface 92, and an intermediate portion 98 that physically and electrically couples first surface 92 and second surface 94. Conductive contact 90 also comprises a sealing member 114 that is securely attached to intermediate portion 98 and/or second surface 94 and seals a fluid 106 within an open space 104 of conductive contact 90. Fluid 106 may comprise any suitable material such as a liquid, a pressurized gas, a low-hardness or low-viscosity elastomer such as a suitable silicone, or a thixotropic material, such as certain gel materials. Fluid 106 sufficiently fills open space 104 so that, when a wafer is urged against a polishing surface 108 of polishing member 100, surface 92 of conductive contact 90 is substantially planar with surface 108. Conductive contact 90 may be secured to support member 96 using any suitable well-known method such as, for example, solder, an adhesive or the like. A conductive structure 112 may be used to make an electrical connection between the conductive material layer of conductive contact 90 and an external circuit. In an exemplary embodiment of the present invention, conductive structure 112 may comprise conductive traces formed on a thin flexible insulating material such as KAPTON® polyimide film or MYLAR® polyester film. These traces are configured so as to be electrically coupled to the second surface 94 of contact 90. Conductive structure 112 may be secured to conductive contact 90 by a conductive adhesive, conductive paint, or the like. The conductive traces of conductive structure 112 may then be used to connect contact 90 to an external circuit (not shown). Alternatively, in another exemplary embodiment of the invention, conductive structure 112 and one or more contacts 90 may be contiguous and formed from the same flexible insulating material.

In one exemplary embodiment of the present invention, sealing member 114 is substantially stiff. In another exemplary embodiment of the present invention, sealing member 114 is a flexible bladder disposed adjacent an opening 110 of support member 96. On application of pressure to surface 92 by the wafer, pressure is transmitted through fluid 106, causing sealing member 114 to flex and extend into opening 110. In this regard, surface 92 may be maintained at a position that is substantially planar with surface 108 of polishing member 100. In another embodiment of the invention, a negative pressure may be applied through port 110 to sealing member 114 causing sealing member 114 to extend into port 110. In this manner, first surface 92 of conductive contact 90 is drawn toward support member 96 and below surface 108 of polishing member 100 so that surface 108 of polishing member 100 may be conditioned without wear or damaged to the conductive material of first surface 92.

Figure 9:
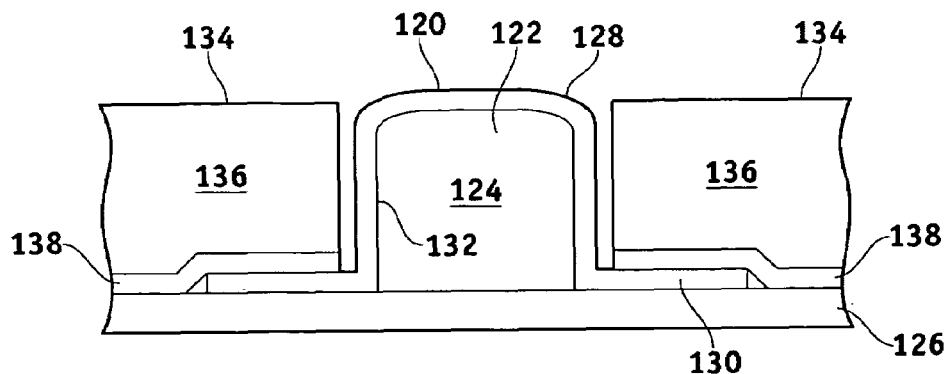
FIG. 9 is a cross-sectional view of a conductive contact in accordance with another exemplary embodiment of the invention.

In a further exemplary embodiment of the present invention, a conductive contact 120 having an open space 122 that is substantially filled with a compressible material 124 is disposed on a support member 126, as illustrated in FIG. 9. Conductive contact 120 is similar to conductive contact 60 of FIG. 3 to the extent that it comprises a first surface 128, a second surface 130 disposed remote from and substantially parallel to first surface 128, and a side surface 132 that physically couples first surface 128 and second surface 130. Conductive contact 120 may or may not have a sealing member (not shown) that seals material 124 within the open space 122. First surface 128 is formed from a flexible insulative material, such as the flexible insulative material 66, upon which is disposed a conductive material layer, such as conductive material layer 68. A conductive structure 138 may be used to make an electrical connection between the conductive material layer of second surface 130 of conductive contact 120 and an external circuit (not shown). Conductive structure 138 may be secured to conductive contact 120 by a conductive adhesive, a conductive paint, or the like. The compressible material 124 may comprise any suitable material that applies an outward force to first surface 128 of conductive contact 120 such as, for example, silicone rubber or a sponge-like material. In this regard, when a wafer is urged against a polishing surface 134 of a polishing member 136, first surface 128 is substantially planar with surface 134. Compressible material 124 may or may not be inert to the ECMP environment, as the conductive material layer 68 protects compressible material 124 from the ECMP environment. First surface 128 and second surface 130 may be electrically coupled using any of the embodiments described above for conductive contact 60 of FIG. 3 or conductive contact 300 of FIGS. 5 and 6. In another exemplary embodiment, compressible material 124 may be a conductive compressible material forming part of the electrical path between first surface 128 and conductive structure 138.

Figure 10:
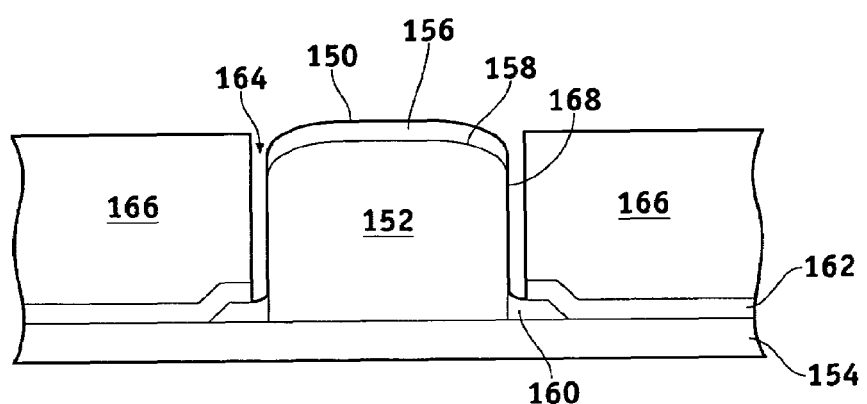
FIG. 10 is a cross-sectional view of a conductive contact in accordance with a further exemplary embodiment of the invention.

Turning to FIG. 10, in accordance with another exemplary embodiment of the present invention, a conductive contact 150 formed from a closed-cell conductive, elastomeric material 152, such as a conductive foam, is disposed on a support member 154 within a hole 164 of a polishing member 166. Conductive contact 150 may be affixed to support member 154 using any suitable method, such as a conductive adhesive, a conductive paint, or solder. A layer of conductive material 156 overlies a first surface 158 of conductive, elastomeric material 152. The conductive material layer 156 may be made of any of the same materials that comprise conductive material layer 68 of FIG. 3. Preferably, conductive material layer 156 comprises gold. The conductive, elastomeric material 152 of conductive contact 150 electrically couples the conductive material layer 156 to a conductive structure 162, which may be in physical contact with conductive, elastomeric material 152 or which may be electrically coupled to conductive, elastomeric material 152 via a contact element 160, such as solder or other suitable conductive material. The conductive, elastomeric material 152 may be comprised of any suitable conductive, elastomeric material, such as ZOFLEX® conductive rubber by Xilor Research LLC of—Knoxville, Tenn. While depletion of the conductive, elastomeric material 152 may occur during ECMP processing, it is substantially limited to side surface(s) 168 because the conductive material layer 156 protects first surface 158.

Figure 11:
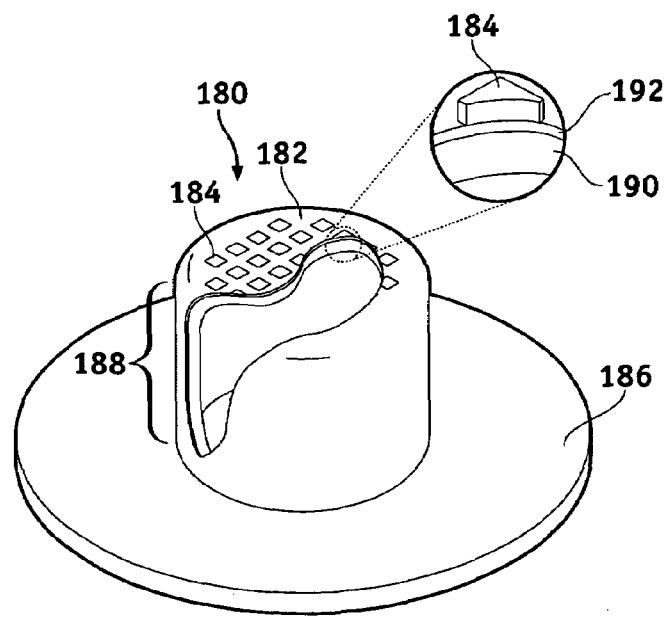
FIG. 11 is a schematic illustration of a conductive contact in accordance with another exemplary embodiment of the invention.

For convenience, FIGS. 3, 5-10 illustrate various exemplary embodiments of the conductive contact of the present invention wherein a continuous layer of conductive material is disposed on the first surface of the conductive contact. It will be appreciated that a continuous layer of conductive material preferably is configured sufficiently thin so that the flexibility of the first surface of the conductive contact may not be substantially compromised. However, it will be understood that the conductive material layer is not limited to a continuous layer configuration but, rather, may have any suitable configuration that allows a sufficient electrical current to be applied to a wafer during an ECMP process while still maintaining flexibility of the first surface of the conductive contact and providing a suitably low wear rate. For example, FIG. 11 illustrates an exemplary embodiment of a conductive contact 180 of the present invention wherein the conductive material layer is configured as a pattern of spaced-apart "pads" or "islands" 184 on a first surface 182 of the conductive contact. The pads 184 may have any suitable shape and may have any suitable height that provides a desirable wear rate. In one embodiment of the invention, the pads have a height of about 10 microns to 100 microns. In a preferred embodiment, the pads have a height of about 20 to 75 microns and, more preferably, the pads are approximately 50 microns high.

Conductive contact 180 comprises first surface 182, as described above, and a second surface 186 that is disposed remote from and substantially parallel to surface 182. An intermediate portion 188 physically couples first surface 182 and second surface 186. In one exemplary embodiment of the invention, if intermediate portion 188 comprises a conductive polymer material, such as conductive, elastomeric material 152 of conductive contact 150 of FIG. 10, intermediate portion 188 may electrically couple conductive pads 184 to a conductive trace (not shown) that is in electrical contact with intermediate portion 188. In another exemplary embodiment of the invention, if intermediate portion 188 comprises a conductive polymer material, such as conductive, elastomeric material 152 of conductive contact 150 of FIG. 10, conductive vias or wires may extend from each of the pads 184 through the conductive polymer material to a conductive sealing member, such as a flexible conductive paint layer, that lies against the back surface of the conductive polymer material and that is electrically coupled to a conductive structure. In a further embodiment of the present invention, as illustrated in FIG. 11, a thin conductive material layer 192, such as copper or gold, may be disposed on first surface 182, second surface 186, and intermediate portion 188, which are formed from a flexible material 190, to electrically couple pads 184 to a conductive structure (not shown). Because the thin conductive material layer 192 does not directly contact the wafer, wear of the conductive material layer 192 is not as significant as wear of the pads 184. Accordingly, the conductive material layer 192 may be sufficiently thin to maintain flexibility of the first surface 182 of the conductive contact while still electrically coupling pads 184 to a conductive trace.

Figure 12:
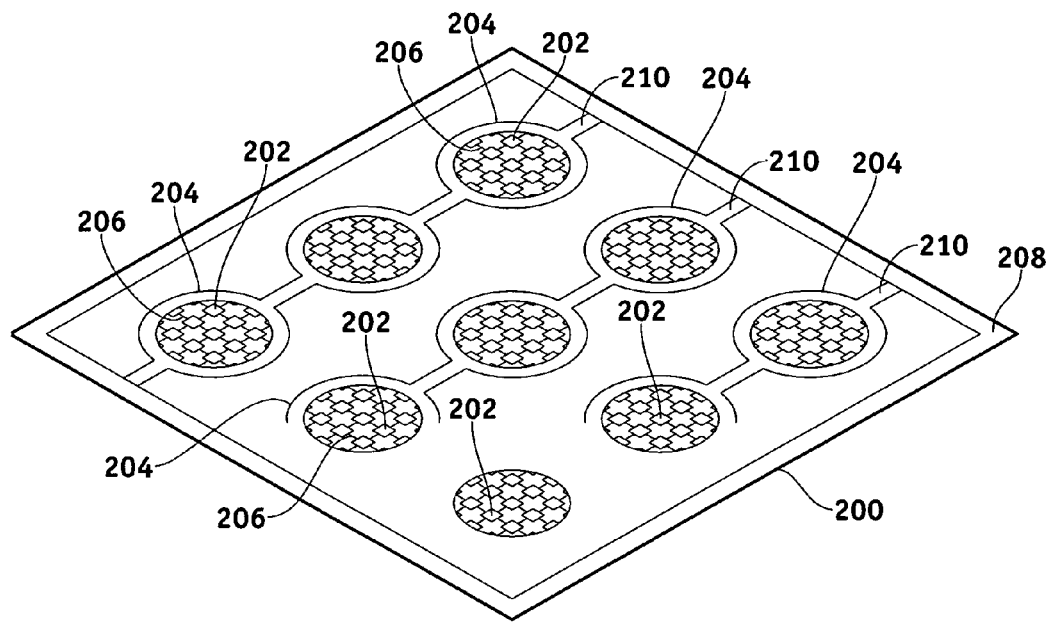
FIGS. 12-14 illustrate a method for fabricating the conductive contact of FIG. 11 in accordance with an exemplary embodiment of the present invention.
Figure 13:
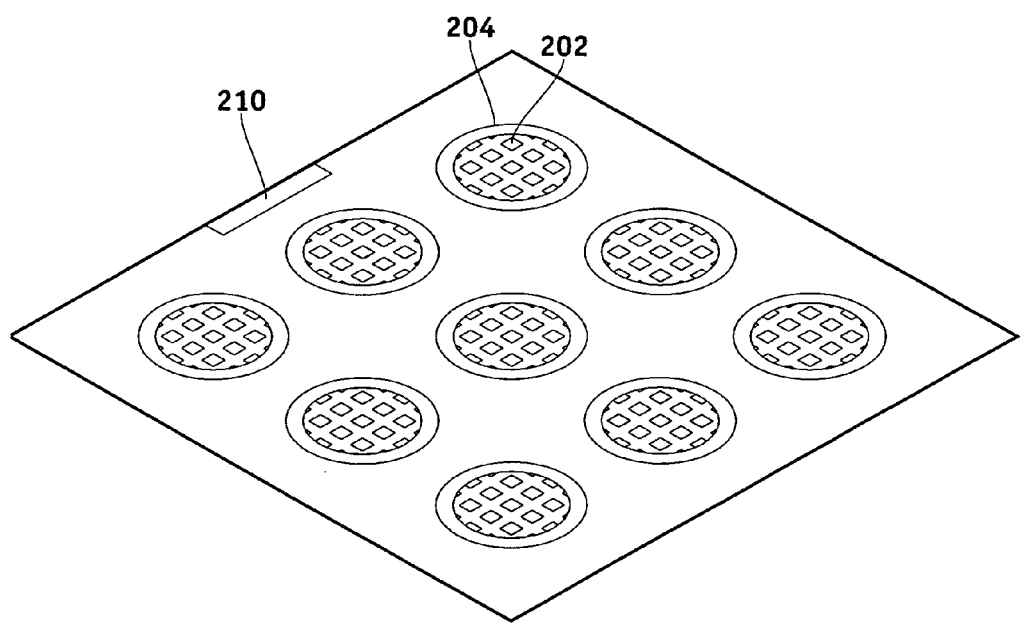
Figure 14:
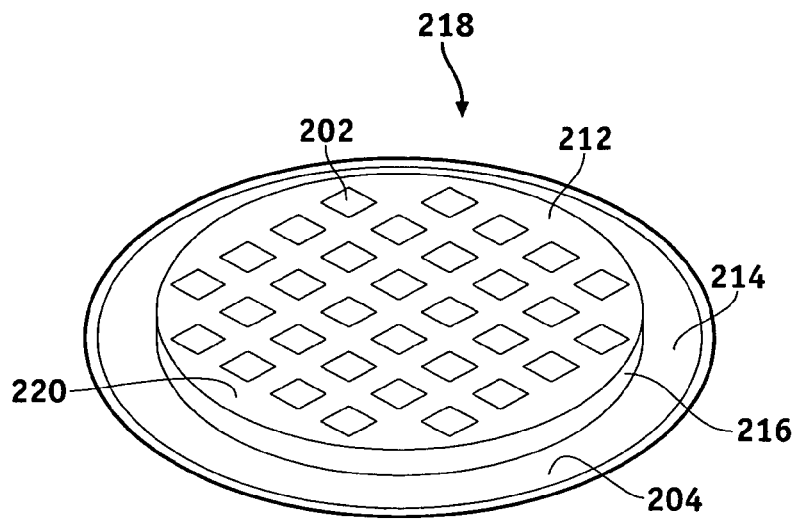

A method for forming an exemplary embodiment of the conductive contact of the present invention, such as conductive contact 180 of FIG. 11, is illustrated in FIGS. 12-14. Referring to FIG. 12, the method may begin by providing a substantially flat, flexible insulative material layer 200, such as KAPTON® polyimide film or MYLAR® polyester films, both from DuPont of Circleville, Ohio. A conductive material, preferably copper, is deposited onto the flexible insulative material layer 200 and is lithographically patterned, as is well known in the art, to form a plurality of pads 202, each of which is electrically coupled to adjacent pads and to a contact ring 204 by conductive connects 206. One contact ring 204 within which pads 202 and connects 206 are disposed may be patterned onto flexible material layer 200 or, alternatively, as illustrated in FIG. 12, a plurality of contact rings 204 within which pads 202 and connects 206 are disposed may be patterned. The rings may be electrically coupled in a series 210 that is electrically coupled to a frame 208. In this manner, parallel processing of multiple series 210 of contact rings 204 may be performed.

An insulating mask (not shown) such as photoresist may be deposited overlying the conductive material and the flexible insulative material layer and patterned so that only the pads 202, the contact rings 204, and a portion 210 of the frame 208 are exposed. A noble metal, preferably gold, is electroplated onto the pads 202, the contact rings 204, and portion 210 of the frame by attaching portion 210 of frame 208 to an electric circuit and immersing the flexible insulative member layer 200 in a suitable electroplating bath, such as AU660 available from Enthone, Inc. of West Haven, Conn. The noble metal is plated until a suitable thickness is deposited. In one embodiment of the invention, the noble metal is plated to a thickness of about 10 microns to 30 microns. In a preferred embodiment, the noble metal is plated to a thickness of about 15 to 25 microns and, more preferably, to about 20 microns. The insulating mask is stripped and the exposed conductive material upon which the noble metal was not deposited is removed by any conventional etchant, as illustrated in FIG. 13.

Referring to FIG. 14, each of the structures comprising the contact rings 204 within which pads 202 are disposed is thermally formed to create a "hat-like" structure having a first surface 212 disposed within a first plane and upon which pads 202 are disposed, a second surface 214 disposed in a second plane that is remote from and parallel to the first plane and upon which contact ring 204 is disposed, and an intermediate portion 216, or side surface, that physically couples the first and second surfaces. Each structure then may be stamped from the flexible insulative material layer to form a conductive contact 218. A thin second conductive material layer 220 is deposited onto the first and side surfaces of conductive contact 218 to electrically couple pads 202 to contact ring 204. Second conductive material layer 220 may comprise any suitable conductive material, such as gold or copper, preferably gold, and may be deposited using any suitable conventional method, such as sputtering.

Figure 1:
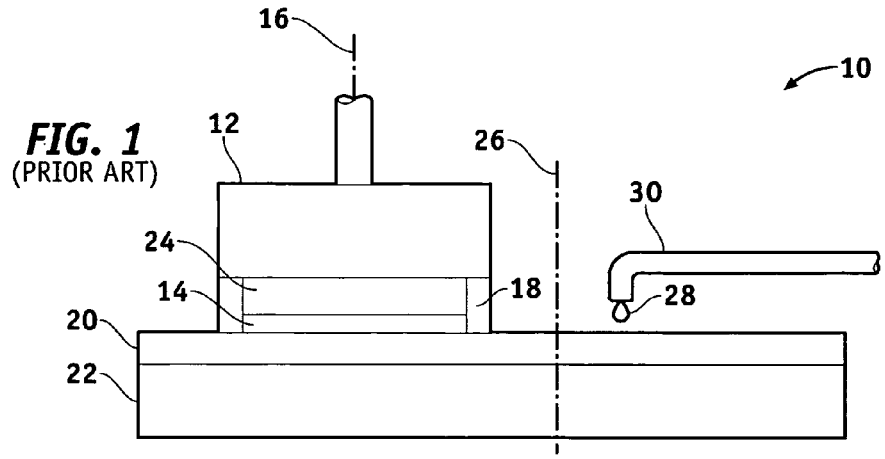
FIG. 1 is a cross-sectional view of a conventional CMP apparatus.
Figure 2:
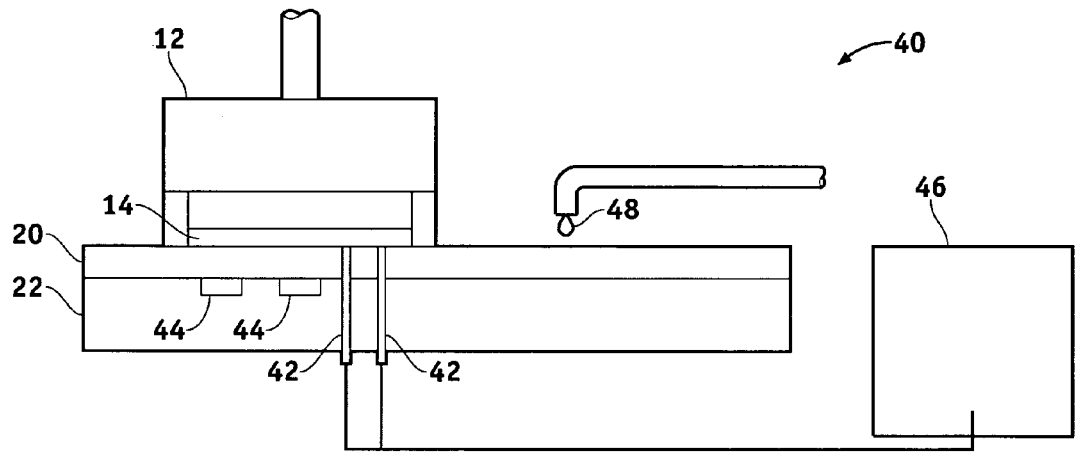
FIG. 2 is a cross-sectional view of a conventional ECMP apparatus.
Figure 15:
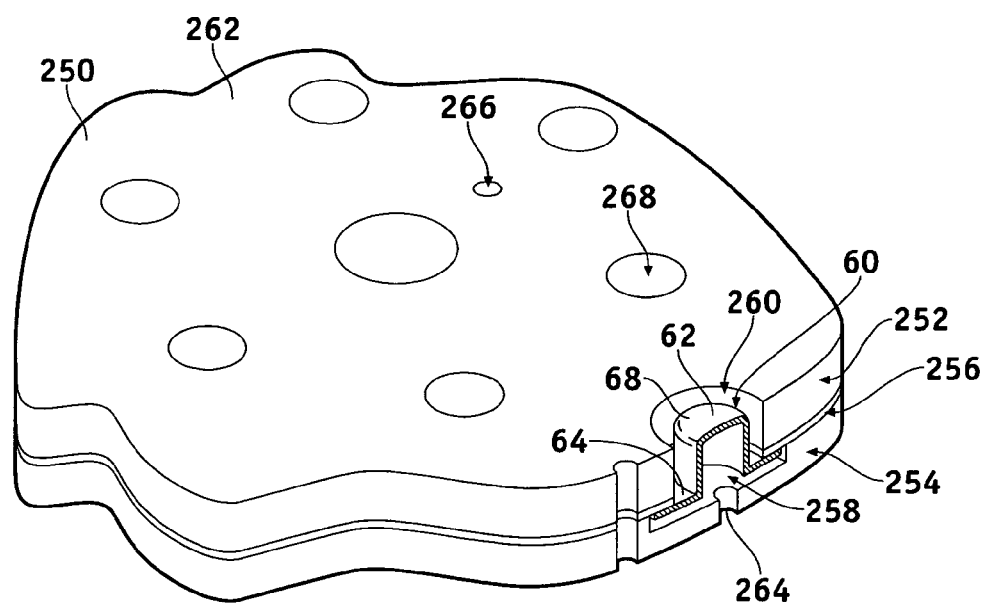
FIG. 15 is a schematic illustration of a conductive polishing apparatus in accordance with an exemplary embodiment of the present invention.

FIG. 15 illustrates a conductive contact, such as conductive contact 60 of FIG. 3, integrated within a portion of a polishing apparatus of an ECMP system to form a portion of a conductive polishing apparatus 250, in accordance with another exemplary embodiment of the present invention. While for illustration purposes conductive contact 60 is shown, it will be appreciated that any of the above-described embodiments of the conductive contacts of the present invention may be used in conductive polishing apparatus 250. Conductive polishing apparatus 250 is configured to be securely affixed upon a platen (not shown), such as platen 22 of FIG. 2, of an ECMP apparatus. While FIG. 15 illustrates the use of one conductive contact 60, it will be appreciated that any suitable number of any of the various exemplary embodiments of the conductive contact of the present invention may be used. The conductive contacts may be distributed in any suitable manner, such as randomly throughout conductive polishing apparatus 250 or so that the conductive contacts remain in continuous contact with a wafer when the wafer is urged against the conductive polishing apparatus 250 during an ECMP process and motion is imparted between the wafer and the conductive polishing apparatus 250. In a preferred embodiment of the invention, the conductive polishing apparatus 250 is moved orbitally while the wafer is rotated about its axis to facilitate continuous contact of the conductive contacts with the wafer.

Conductive polishing apparatus 250 comprises a polishing member 252, backing member 254, and a conductive member 256 that is interposed between polishing member 252 and backing member 254. Polishing member 252 is suitably formed of an insulating material such as a polymeric material, a polymeric/inorganic composite material, or a ceramic insulation material. The hardness and density of the polishing member 252 may be selected based on the type of metal to be polished or removed. Polyurethane polishing pads are available from Rodel Inc. of Phoenix, Ariz. and may be advantageously used to polish a wafer, although it should be appreciated that any suitable polishing member could be used. Backing member 254 also is suitably formed of an insulative material. Backing member 254 may be formed of the same material from which polishing member 252 is formed or may be formed of a different material that has the same or different flexible properties. It will be appreciated by those in the art that the materials selected for polishing member 252 and backing member 254 may be selected based on the compliance properties of conductive polishing apparatus 250 that are desired.

Conductive member 256 may comprise any suitable conductive material or may comprise any suitable non-conductive material upon which is disposed a conductive layer of material. For example, conductive member 256 may comprise a layer of metal, such as copper, or may comprise a non-conductive material upon which is disposed a copper or other conductive material layer.

A recess 258 is formed within backing member 254. The recess 258 has a width or diameter that is of a size that permits conductive contact 60 to sit therewithin. A first hole 260 is formed within polishing member 252 and conductive member 256 coaxial with recess 258. Accordingly, conductive contact 60 extends from recess 258 through first hole 260 so that, when a wafer is urged against a polishing surface 262 of polishing member 252, first surface 62 of conductive contact 60 is substantially planar with polishing surface 262. In an exemplary embodiment of the invention, backing member 254 may comprise a second hole 264 that opens at one end into recess 258 and open space 82 of conductive contact 60. The other end of second hole 264 may be in fluid communication with a manifold apparatus (not shown). In this regard, a fluid, such as air or electrolyte, may be transported from the manifold apparatus through second hole 264 into open space 82 to outwardly extend first surface 62 of conductive contact 60. Alternatively, a negative pressure may be imparted to open space 82 through second hole 264 to recess first surface 62 of conductive contact 60 so that polishing member 252 can be conditioned.

As described above, conductive material layer 68 is disposed on second surface 64 of conductive contact 60. Accordingly, conductive member 256 is disposed so that a conductive surface of conductive member 256 is electrically coupled to second surface 64. As illustrated in FIG. 15, in an exemplary embodiment of the invention, conductive member 256 is disposed on second surface 64 of conductive contact 60. However, it will be appreciated that the present invention is not so limited. In another exemplary embodiment of the invention, conductive contact 60 may be formed so that the underside surface of second surface 64 is electrically coupled to first surface 62, for example as described above for contact 300 of FIGS. 5 and 6. In this regard, conductive contact 60 may be disposed onto conductive member 256 so that first surface 62 of conductive contact 60 is electrically coupled to conductive member 256. If the conductive contact is formed of a conductive, elastomeric material, such as conductive, elastomeric material 152 of contact 150 of FIG. 10, conductive member 256 may be electrically coupled to the conductive contact via conductive solder, conductive paint, or the like.

In another exemplary embodiment of the present invention, polishing member 252, conductive member 256 and backing member 254 may each comprise one or more coaxial third holes 266 that are in fluid communication with a manifold apparatus (not shown). An electrolyte or other polishing solution may be urged from the manifold apparatus through hole 266 to polishing surface 262 of polishing member 252. In a further exemplary embodiment of the present invention, polishing member 252, conductive member 256, and backing member 254 may each comprise one or more coaxial fourth holes 268 that expose counterelectrodes or through which counterelectrodes (not shown) may be disposed.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A conductive contact for use in an electrochemical mechanical planarization apparatus, the conductive contact comprising:
   a first conductive surface comprising a flexible material;
   a conductive element that is disposed remote from and annularly about said first conductive surface and that is configured for electrical coupling to an external circuit; and
   an intermediate portion that physically and electrically couples said first conductive surface and said conductive element.

2. The conductive contact of claim 1, wherein said first conductive surface comprises a conductive material layer overlying said flexible material.

3. The conductive contact of claim 2, wherein said conductive material layer comprises gold.

4. The conductive contact of claim 2, wherein said conductive material layer has a thickness in the range of about 10 to 125 microns.

5. The conductive contact of claim 2, wherein said conductive material layer is a layer of spaced-apart conductive pads.

6. The conductive contact of claim 1, wherein said conductive element is a second conductive surface that is substantially parallel to said first conductive surface.

7. The conductive contact of claim 6, wherein said second conductive surface is electrically coupled to a platen of the electrochemical mechanical apparatus.

8. The conductive contact of claim 6, wherein said first conductive surface, said second conductive surface, and said intermediate portion comprise a conductive material layer overlying said flexible material.

9. The conductive contact of claim 6, wherein said first conductive surface comprises a conductive via and wherein said intermediate portion comprises a wire that extends from said conductive via to said second conductive surface.

10. The conductive contact of claim 1, wherein said first conductive surface comprises a conductive via and wherein said intermediate portion comprises a conductive material layer disposed on an underside of said conductive contact and electrically coupled to said via.

11. The conductive contact of claim 1, wherein said first conductive surface and said intermediate portion form an open space of said conductive contact.

12. The conductive contact of claim 1, further comprising a sealing member that is disposed remote from and substantially parallel to said first conductive surface, wherein said first conductive surface, said intermediate portion and said sealing member form a space within the conductive contact and wherein said space is filled with a fluid.

13. The conductive contact of claim 12, wherein said sealing member is flexible.

14. The conductive contact of claim 1, further comprising a compressible member having a first surface and a side surface, wherein said first conductive surface is disposed on said first surface of said compressible member and said intermediate portion is disposed on said side surface of said compressible member.

15. The conductive contact of claim 1, wherein said intermediate portion comprises a conductive, elastomeric material.

16. The conductive contact of claim 15, wherein said conductive element comprises solder, conductive paint, or conductive adhesive.

17. A conductive planarization apparatus for use in electrochemical mechanical planarization, the conductive planarization apparatus comprising:
   a first insulating member having a first flexible property;
   a second insulating member having a second flexible property and having a hole disposed therein;
   a conductive member disposed between said first insulating member and said second insulating member and configured for electrical coupling to an external circuit; and
   a conductive contact disposed within said hole of said second insulating member, wherein said conductive contact has a flexible conductive surface that is disposed remote from and substantially parallel to said conductive member and that is electrically coupled to said conductive member.

18. The conductive planarization apparatus of claim 17, wherein said conductive contact comprises an open space and said first insulating member has a port that is in fluid communication with said open space.

19. The conductive planarization apparatus of claim 17, wherein said conductive contact has a height such that, when a wafer is urged against a polishing surface of said second insulating member, said flexible conductive surface of said conductive contact is substantially planar with said polishing surface.

20. The conductive planarization apparatus of claim 17, wherein said first and second flexible properties are the same.

21. The conductive planarization apparatus of claim 17, wherein said first insulating member, said second insulating member, and said conductive member comprise coaxial openings configured for disposal or exposure of a counterelectrode.

* * * * *